US010620359B2

(12) United States Patent
Yamashita

(10) Patent No.: US 10,620,359 B2
(45) Date of Patent: Apr. 14, 2020

(54) LIGHTING DEVICE AND DISPLAY DEVICE

(71) Applicant: Sharp Kabushiki Kaisha, Sakai, Osaka (JP)

(72) Inventor: Hidehiko Yamashita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/143,560

(22) Filed: Sep. 27, 2018

(65) Prior Publication Data

US 2019/0101683 A1 Apr. 4, 2019

(30) Foreign Application Priority Data

Sep. 29, 2017 (JP) .................................. 2017-190765

(51) Int. Cl.
*F21V 8/00* (2006.01)
*G02F 1/13357* (2006.01)
*G02B 6/24* (2006.01)
*G02F 1/1335* (2006.01)

(52) U.S. Cl.
CPC ............ *G02B 6/0025* (2013.01); *G02B 6/005* (2013.01); *G02B 6/0051* (2013.01); *G02B 6/0068* (2013.01); *G02B 6/243* (2013.01); *G02F 1/133606* (2013.01); *G02F 1/133512* (2013.01); *G02F 2201/56* (2013.01)

(58) Field of Classification Search
CPC . G02B 6/0025; G02B 6/243; G02F 1/133512; G02F 1/133606
See application file for complete search history.

(56) References Cited

U.S. PATENT DOCUMENTS

| 7,973,873 | B2* | 7/2011 | Ha | G02F 1/133606 349/110 |
| 8,711,306 | B2* | 4/2014 | Oohira | G02B 6/0081 349/110 |
| 9,077,791 | B2* | 7/2015 | Jeong | G06F 1/1637 |
| 9,817,179 | B2* | 11/2017 | Azuma | G02F 1/133308 |
| 2004/0135941 | A1* | 7/2004 | Nam | G02F 1/133512 349/110 |
| 2008/0094831 | A1* | 4/2008 | Matsumoto | G02F 1/133604 362/235 |
| 2014/0049987 | A1* | 2/2014 | Shin | G02F 1/133512 362/612 |

FOREIGN PATENT DOCUMENTS

JP 2009-199971 A 9/2009

\* cited by examiner

*Primary Examiner* — Mary Ellen Bowman
(74) *Attorney, Agent, or Firm* — Keating & Bennett, LLP

(57) ABSTRACT

A lighting device includes a light source, a light guide plate, an optical sheet, and a light blocking member. The light guide plate includes a section of a peripheral surface opposed to the light source defined as a light entering surface, a section of the peripheral surface opposite from the light entering surface defined as an opposite surface, and a light exiting plate surface through which light exits. The optical sheet is disposed over the light exiting plate surface. The light blocking member is in an outer edge area of at least one of the light guide plate and the optical sheet to block the light from the light guide plate through the light exiting plate surface. The light blocking member extends in a peripheral direction along the peripheral surface in which the light entering surface and the opposite surface are arranged.

11 Claims, 8 Drawing Sheets

LIGHTING DEVICE AND DISPLAY DEVICE

CROSS REFERENCE TO RELATED APPLICATION

This application claims priority from Japanese Patent Application No. 2017-190765 filed on Sep. 29, 2017. The entire contents of the priority application are incorporated herein by reference.

TECHNICAL FIELD

The technology described herein relates to a lighting device and a display device.

BACKGROUND

A known lighting device included in a liquid crystal display device includes a light source and a light guide member. Light rays emitted by the light source enter the light guide member through a light entering portion of the light guide member and exit the light guide member through a light exiting portion to illuminate a display panel. The light guide member has a round shape. The light source includes light source components that are arranged at a periphery of the light guide member such that light rays from the light source components cross one another. An example of such a lighting device is disclosed in Japanese Patent Application Publication No. 2009-199971.

An amount of light exiting from the lighting device disclosed in the above publication through the light exiting portion tends to locally increase on an opposite side from the light entering portion with the center therebetween. This may cause unevenness in the amount of light exiting from the lighting device through the light exiting portion. Such unevenness may cause uneven brightness. The uneven brightness may become further recognizable in a liquid crystal panel using light from a lighting device and including a frame in decreased size.

SUMMARY

The technology described herein was made in view of the above circumstances. An object is to reduce uneven brightness.

A lighting device according to the technology described herein includes a light source, a light guide plate, an optical sheet, and a light blocking member. The light guide plate includes a section of a peripheral surface opposed to the light source defined as a light entering surface, a section of the peripheral surface opposite from the light entering surface defined as an opposite surface, and a light exiting plate surface through which light exits. The optical sheet is disposed over the light exiting plate surface and configured to exert optical effects on the light exiting from the light guide plate through the light exiting plate surface. The light blocking member is in an outer edge area of at least one of the light guide plate and the optical sheet to block the light from the light guide plate through the light exiting plate surface. The light blocking member extends in a peripheral direction along the peripheral surface in which the light entering surface and the opposite surface are arranged.

The light emitted by the light source enter the light guide plate through the light entering surface, travels through the light guide plate, and exits through the light exiting plate surface. The light from the light exiting plate surface receives the optical effects from the optical sheet. A larger number of light rays in the light inside the light guide plate exist in a section of the light guide plate closer to the light entering surface. Therefore, an amount of light rays exiting from a section of the light exiting plate surface around the light entering surface tends to be greater in comparison to other sections. The laager number of light rays may create a bright spot. Some of the light rays linearly traveling from the light entering surface toward the opposite surface of the light guide plate reach the opposite surface. A majority of the light rays reached the opposite surface leaks from the opposite surface. The light rays may be reflected by an external component and reenter the light guide plate through the opposite surface and immediately exit through the light exiting plate surface. An amount of light rays from a section of the light exiting plate surface around the opposite surface tends to be greater in comparison to other sections. The light rays may create a bright spot.

The light blocking member is disposed in the outer edge area of at least one of the light guide plate and the optical sheet to block the light rays from the light exiting plate surface. The light blocking member extends in the peripheral direction along the peripheral surface in which the light entering surface and the opposite surface are arranged. According to the configuration, even if the amount of light rays from the section of the light exiting plate surface around the light entering surface or the opposite surface is greater, the light rays are blocked by the light blocking member. Therefore, unevenness in the amount of light emitted by the lighting device is less likely to occur and the bright spots are less likely to be recognized.

According to the technology described herein, the uneven brightness can be reduced.

DETAILED DESCRIPTION

First Embodiment

Figure 1:
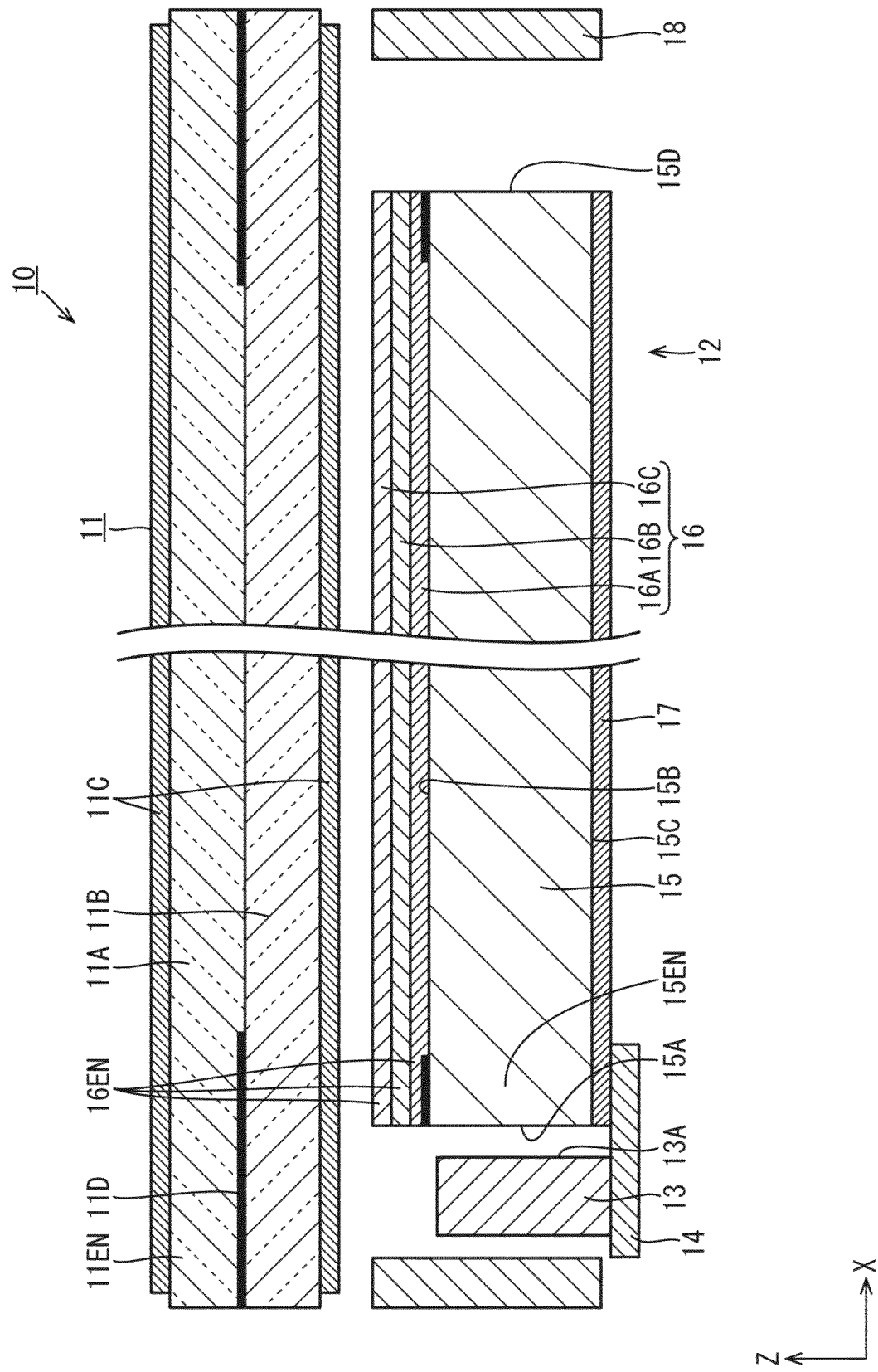
FIG. 1 is a cross-sectional view of a liquid crystal display device according to a first embodiment.

A first embodiment will be described with reference to FIGS. 1 an 2. In this section, a liquid crystal display device 10 (a display device) will be described. X-axes, Y-axes, and Z-axes may be present in the drawings. The axes in each drawing correspond to the respective axes in other drawings. The upper side and the lower side in FIG. 1 correspond to a front side and a back side of the liquid crystal display device 10, respectively.

As illustrated in FIG. 1, the liquid crystal display device 10 includes a liquid crystal panel 11 (a display panel), a backlight unit 12 (a lighting device), a liquid crystal layer, and a sealant. The liquid crystal panel 11 is configured to display images. The backlight unit 12 is disposed behind the liquid crystal panel 11 and configured to illuminate the liquid crystal panel 11 for image display. The liquid crystal display device 10 is used for, but not limited to, a wearable terminal such as a smartwatch.

As illustrated in FIG. 1, the liquid crystal panel 11 includes a pair of substantially transparent glass substrates 11A and 11B having high light transmissivity. One of the substrates 11A and 11B on the front side is a CF substrate 11A and the other one of the substrates 11A and 11B on the rear side (the back side) is an array substrate 11B. Polarizing plates 11C are attached to outer surfaces of the substrates 11A and 11B. The liquid crystal layer is sandwiched between the substrates 11A and 11B. The liquid crystal layer includes liquid crystal molecules having optical characteristics that change according to application of electric field. The sealant surrounds and seals the liquid crystal layer.

On an inner surface of the array substrate 11B, thin film transistors (TFTs), which are switching components, and pixel electrodes are disposed in a matrix. On the inner surface of the array substrate 11B, gate lines and source lines are disposed in a grid to surround the TFTs and the pixel electrodes. Signals related to images are transmitted through the gate lines and the source lines. On an inner surface of the CF substrate 11A, color filters are disposed at positions corresponding to the pixel electrodes. Red (R), green (G), and blue (B) color filters are repeatedly arranged. On the inner surface of the CF substrate 11A, a panel-side light blocking member 11D (a black matrix) is disposed for reducing color mixture between the color filters. The panel-side light blocking member is formed in a grid to separate the color filters from one another in a display area, which is an inner area of the liquid crystal panel 11. As illustrated in FIG. 1, the panel-side light blocking member 11D includes an outer edge area 11EN that is formed in a solid pattern in a non-display area of the liquid crystal panel 11. In FIG. 1, the panel-side light blocking member 11D is indicated with a thick line on the inner surface of the CF substrate 11A. On the inner surface of the CF substrate 11A, a common electrode is disposed to be opposed to the pixel electrodes. Alignment films are formed on the inner surfaces of the substrates 11A and 11B for orienting the liquid crystal molecules in the liquid crystal layer.

As illustrated in FIG. 1, the backlight unit 12 includes light emitting diodes (LEDs) 13, an LED substrate 14 (a light source substrate), a light guide plate 15, a reflection sheet 17 (a reflection member), and a frame 18. The LEDs 13 are light sources mounted on the LED substrate 14. The light guide plate 15 guides light rays from the LEDs 13. An optical sheet 16 is disposed on the front surface of the light guide plate 15. The reflection sheet 17 is disposed on the back surface of the light guide plate 15. The frame 18 surrounds the LEDs 13, the light guide plate 15, and the optical sheet 16. The backlight unit 12 is an edge light type (a side light type) lighting unit configured to convert directional light rays from the LEDs 13 into planar light and illuminate the liquid crystal panel 11 with the planar light. Components of the backlight unit 12 will be described in detail.

As illustrated in FIG. 1, each LED 13 includes a substrate fixed to the LED substrate 14 and an LED chip disposed on the substrate and sealed with a sealant. The LED chip is configured to emit a single color of blue. Phosphors (e.g., yellow phosphors, green phosphors, red phosphors) are dispersed in the sealant. According to the configuration, each LED 13 emits white light. Each LED 13 includes a mounting surface that is mounted to the LED substrate 14 and a surface adjacent to the mounting surface defined as a light emitting surface 13A. Namely, the LEDs 13 are side-emitting type LEDs. The LED substrate 14 is disposed on the rear side of the liquid crystal display device 10 relative to the reflection sheet 17. The LEDs 13 are surface mounted on the front surface of the LED substrate 14 and wirings for supplying power to the LEDs 13 are patterned on the front surface of the LED substrate 14.

The light guide plate 15 is made of substantially transparent synthetic resin (e.g., acrylic resin including PMMA, polycarbonate). The light guide plate 15 has a refractive index substantially greater than that of air. As illustrated in FIG. 1, the light guide plate 15 is disposed immediately behind the optical sheet 16. Sections of a peripheral surface of the light guide plate 15 are defined as light entering surfaces 15A (light source opposed surfaces) opposed to the LEDs 13 and through which light rays from the LEDs 13 enter. Sections of the peripheral surface of the light guide plate 15 on opposite sides from the light entering surfaces 15A are defined as opposite surfaces. A front plate surface of the light guide plate 15 (closer to the liquid crystal panel 11) is defined as a light exiting plate surface 15B through which the light exit toward the liquid crystal panel 11. A back plate surface of the light guide plate 15 on the rear side is defined as an opposite plate surface 15C. The light guide plate 15 receives the light rays from the LEDs 13 through the light entering surfaces 15A, passes the light rays therethrough, and guides the light rays along the Z-axis direction toward the light exiting plate surface 15B. The light rays exit through the light exiting plate surface 15B and travel toward the optical sheet 16 and the liquid crystal panel 11 (to the front side or the light exiting side).

As illustrated in FIG. 1, the optical sheet 16 is disposed over the light exiting plate surface 15B of the light guide plate 15. The optical sheet 16 is disposed between the liquid crystal panel 11 and the light guide plate 15 and configured to exert optical effects on the light traveling from the light guide plate 15 to the liquid crystal panel 11. The optical sheet 16 includes a diffuser sheet 16A, a first prism sheet 16B, and a second prism sheet 16C disposed in this sequence from the rear side. The diffuser sheet 16A includes a base made of substantially transparent synthetic resin and diffusing particles dispersed in the base. The diffuser sheet 16A has a function of diffusing light that passes through the diffuser sheet 16A. The first prism sheet 16B includes a base made of substantially transparent synthetic resin and prisms disposed on a plate surface of the base to extend in one direction. The second prism sheet 16C includes a base made of substantially transparent synthetic resin and prisms disposed on a plate surface of the base to extend in one direction. The first prism sheet 16B and the second prism sheet 16C collect the light rays in directions in which the prisms are arranged. The first prism sheet 16B and the second prism sheet 16C are disposed such that the prisms in the first prism sheet 16B are perpendicular to the prisms in the second prism sheet 16C. The optical sheet 16 includes a peripheral surface that is substantially flush with the peripheral surface of the light guide plate 15.

As illustrated in FIG. 1, the reflection sheet 17 is disposed to cover the opposite plate surface 15C of the light guide plate 15. The reflection sheet 17 has high light reflectivity and effectively reflects light rays that leak from the light guide plate 15 through the opposite plate surface 15C toward the front side (toward the light exiting plate surface 15B). The reflection sheet 17 includes a peripheral surface that is substantially flush with the peripheral surface of the light guide plate 15. The frame 18 is made of synthetic resin (e.g., polycarbonate) with a white surface. The frame 18 is slightly larger than the light guide plate 15. The frame 18 is disposed to collectively surround the LEDs 13 and the light guide plate 15.

Figure 2:
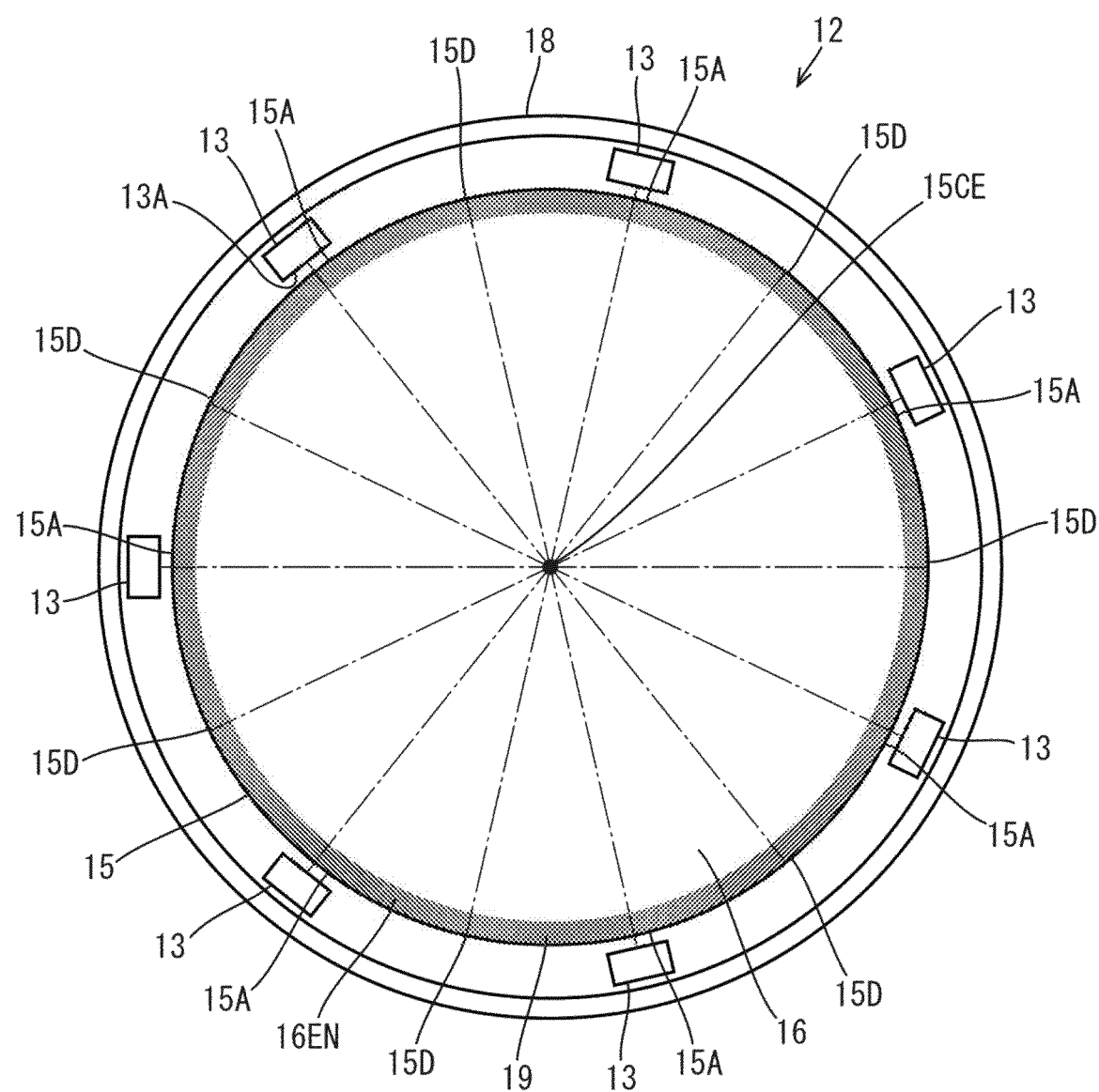
FIG. 2 is a plan view of a backlight unit included in the liquid crystal display device.

A two-dimensional configuration of the backlight unit 12 will be described with reference to FIG. 2. As illustrated in FIG. 2, the backlight unit 12 has a round shape in a plan view. The liquid crystal panel 11 has a round shape similar to the shape of the backlight unit 12. The LED substrate 14, the light guide plate 15, the optical sheet 16, the reflection sheet 17, and the frame 18 included in the backlight unit 12 have round shapes in the plan view. The LED substrate 14 and the frame 18 have annular shapes with openings in the center. The LEDs 13 (seven LEDs 13 in this embodiment) are arranged at intervals in a peripheral direction (a circumferential direction) of the LED substrate 14. The LEDs 13 are disposed to surround the light guide plate 15 for an entire circumference of the light guide plate 15 such that light emitting surfaces 13A are oriented toward the center 15CE of the light guide plate 15. In FIG. 2, lines that connect centers of the light emitting surfaces 13A of the LEDs 13 to the center 15CE of the light guide plate 15 are indicated with chain lines. Each line passes centers of the light entering surfaces 15A and the opposite surfaces 15D of the light guide plate 15 with respect to the circumferential direction. The intervals of the adjacent LEDs 13 are about equal to one another. Specifically, the LEDs 13 are separated from each other at an angle of about 51.4 degrees (equiangularly arranged). The LEDs 13 are not opposed to the opposite surfaces 15D of the light guide plate 15. Namely, the light entering surfaces 15A and the opposite surfaces 15D are alternately arranged at equal intervals in the circumferential direction of the light guide plate 15. The light entering surfaces 15A and the opposite surfaces 15D do not correspond to each other with respect to the circumferential direction. The number of the light entering surfaces 15A and the number of the opposite surfaces 15D are equal to the number of the LEDs 13 on the peripheral surface of the light guide plate 15. An angular space between each light entering surface 15A and the opposite surface 15D adjacent to the light entering surface 15A in the circumferential direction is a half of an angular space between the LDEs 13 adjacent to each other in the circumferential direction.

In the backlight unit 12 having the configuration described above, as illustrated in FIGS. 1 and 2, the light rays emitted by the LEDs 13 enter the light guide plate 15 through the light entering surfaces 15A, travel through the light guide plate 15, and exit the light guide plate 15 through the light exiting plate surface 15B. The optical effects are exerted on the light rays exiting through the light exiting plate surface 15B by the optical sheet 16. More light rays exist in areas inside the light guide plate 15 closer to the light entering surfaces 15A. The amounts of light rays exiting from areas of the light exiting plate surface 15B around the light entering surfaces 15A tend to be larger. Therefore, the areas of the light exiting plate surface 15B may be recognized as bright spots. Among the light rays entering through the light entering surface 15A, a majority of the light rays linearly traveling toward the opposite surfaces 15D of the light guide plate reaches the opposite surfaces 15D. A majority of the light rays reached the opposite surfaces 15D leaks through the opposite surfaces 15D. The light rays from the opposite surfaces 15D may be reflected by the frame 18. The reflected light rays enter the light guide plate 15 through the opposite surfaces 15D and exit through the light exiting plate surface 15B. Therefore, the amounts of light exiting from areas of the light exiting plate surface 15B around the opposite surfaces 15D tend to be locally large. The areas of the light exiting plate surface 15B may be recognized as bright spots. In this embodiment, the light entering surfaces 15A and the opposite surfaces 15D do not correspond to each other on the peripheral surface of the light guide plate 15. Therefore, the number of the light entering surfaces 15A and the number of the opposite surfaces 15D are equal to the number of the LEDs 13. In comparison to arrangement in which the light entering surfaces 15A and the opposite surfaces 15D correspond to each other, the number of the bright spots resulting from the arrangement of the light entering surfaces 15A and the opposite surfaces 15D may be doubled.

As illustrated in FIGS. 1 and 2, the optical sheet 16 includes a light blocking member 19 for blocking the light rays exiting from the light guide plate 15 through the light exiting plate surface 15B. In FIG. 1, the light blocking member 19 is indicated with thick lines on the inner surface of the diffuser sheet 16A. In FIG. 2, the light blocking member 19 is shaded. The light blocking member 19 is at an outer edge area 16EN of the optical sheet 16. The light blocking member 19 is disposed in the outer edge area 16EN of the optical sheet 16 to correspond to at least the light entering surfaces 15A and the opposite surfaces 15D with respect to the circumferential direction along the peripheral surface. According to the configuration, even if the amounts of the light rays exiting from the areas of the light exiting plate surface 15B around the light entering surface 15A and the opposite surfaces 15D are locally larger, the light rays are blocked by the light blocking member 19. Therefore, unevenness is less likely to occur in the amount of light exiting from the backlight unit 12 and the bright spots are less likely to be recognized. In this embodiment, the larger number of bright spots may be created due to the arrangement of the light entering surfaces 15A and the opposite surfaces 15D. With the light blocking member 19, the bright spots are less likely to be recognizable and thus occurrence of uneven brightness is effectively reduced.

The light blocking member 19 will be described in detail. As illustrated in FIG. 1, the light blocking member 19 is included in the diffuser sheet 16A that is the closest to the light guide plate 15 among the sheets in the optical sheet 16. According to the configuration, the light rays exiting from the light guide plate 15 through the light exiting plate surface 15B can be blocked by the light blocking member 19 in the diffuser sheet 16A disposed the closest to the light guide plate 15. In comparison to a configuration in which a light blocking member is disposed on the first prism sheet 16B or the second prism sheet 16C, the bright spots are further less likely to be recognized. The light blocking member 19 is formed on a section of a plate surface of the diffuser sheet 16A on the rear side in the outer edge area 16EN through printing with black ink having high light absorption properties. The light blocking member 19 is disposed to overlap the outer edge area 15EN of the light guide plate 15 in the plan view. The light blocking member 19 is disposed to overlap the outer edge area 11EN of the liquid crystal panel 11 and the panel-side light blocking member 11D in the outer edge area 11EN in the plan view.

As illustrated in FIG. 2, the light blocking member 19 extend in the circumferential direction across the opposite surfaces 15D between the light entering surfaces 15A. In comparison to a configuration in which light blocking members are arranged in the circumferential direction to correspond to the light entering surfaces 15A and the opposite surfaces 15D, the amount of the light rays blocked by the light blocking member 19 increases. Furthermore, the light blocking member 19 more likely to correspond to the light entering surfaces 15A and the opposite surfaces 15D with respect to the circumferential direction. Therefore, the light rays are more properly blocked and thus the bright spots are further less likely to be recognized. The light blocking member 19 extends for an entire circumference of the outer edge area 16EN. In comparison to a configuration in which the light blocking member is divided in the circumferential direction, the larger amount of the light rays can be blocked. Furthermore, the light blocking member 19 is more likely to correspond to the light entering surfaces 15A and the opposite surfaces 15D with respect to the circumferential direction. The light rays are further properly blocked and thus the bright spots are further less likely to be recognized. The light blocking member 19 can be more easily positioned relative to the light guide plate 15 and the optical sheet 16. Furthermore, positioning of the light blocking member 19 relative to the light entering surfaces 15A and the opposite surfaces 15D with respect to the circumferential direction is not required. This improves productivity.

According to the configuration described above, the uneven brightness in the light emitted by the backlight unit 12 is reduced and thus the liquid crystal display device 10 is provided with high display quality.

The panel-side light blocking member 11D is disposed such that an inner edge of the panel-side light blocking member 11D is located inner (closer to the center 15CE of the light guide plate 15) in comparison to the light blocking member 19. With the panel-side light blocking member 11D, the light blocking member 19 is less likely to be directly viewed by a user of the liquid crystal display device 10.

Second Embodiment

A second embodiment will be described with reference to FIGS. 2 and 3. The second embodiment includes a light blocking member 119 that is different from the light blocking member 19 in the first embodiment. Configurations, operations, and effects similar to those of the first embodiment will not be described.

Figure 3:
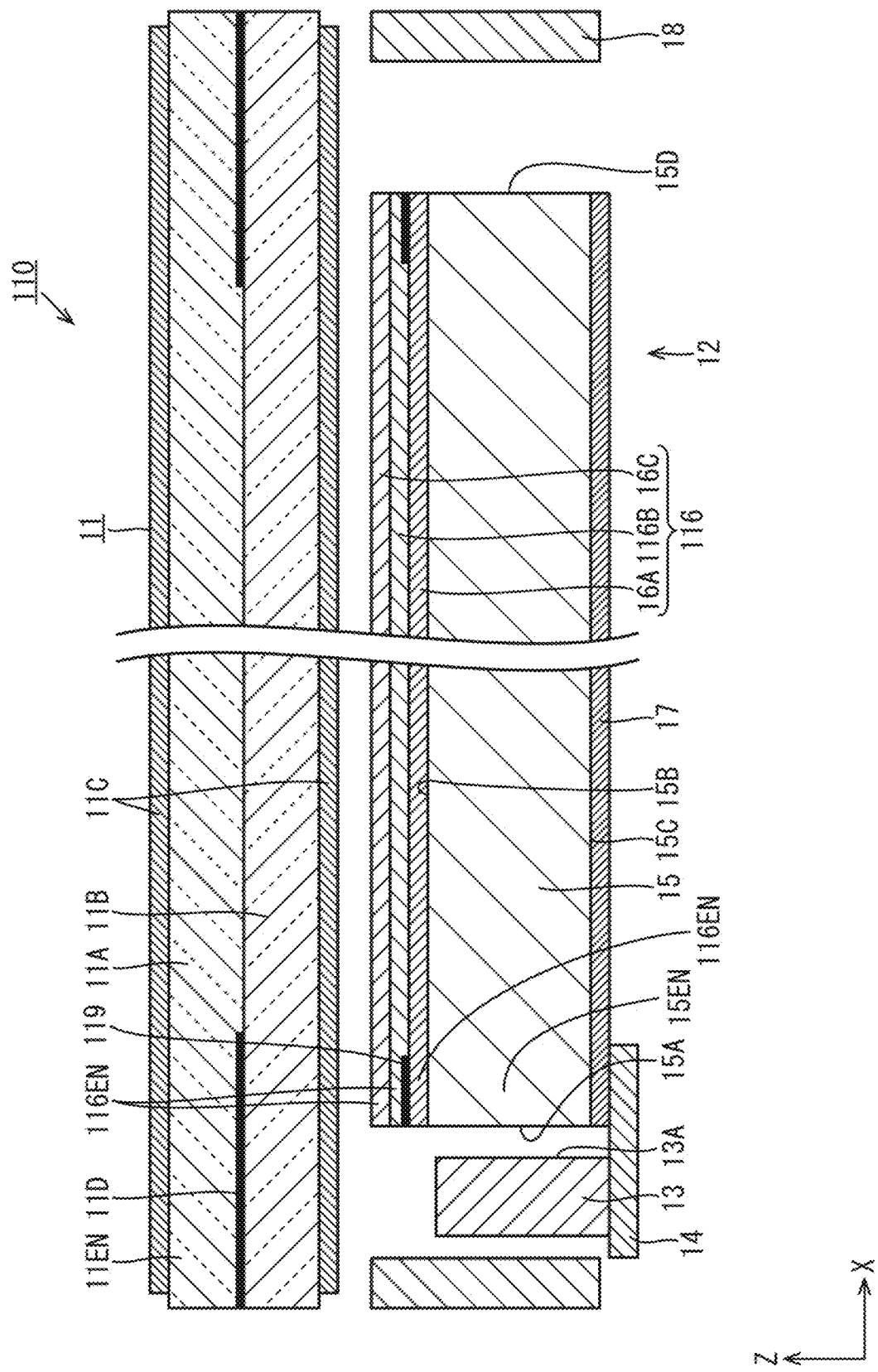
FIG. 3 is a cross-sectional view of a liquid crystal display device according to a second embodiment.

As illustrated in FIG. 3, a liquid crystal display device 110 according to the second embodiment includes an optical sheet 116. The optical sheet 116 includes the diffuser sheet 16A, a first prism sheet 116B, and the second prism sheet 16C. The first prism sheet 116B is disposed between the diffuser sheet 16A and the second prism sheet 16C. The light blocking member 119 is formed on a plate surface of the first prism sheet 116B in an outer edge area 116EN of the first prism sheet 116B through printing.

Third Embodiment

A third embodiment will be described with reference to FIG. 4. The third embodiment includes first light blocking members 219A and second light blocking members 219B that are different from the light blocking member 19 in the first embodiment. Configurations, operations, and effects similar to those of the first embodiment will not be described.

Figure 4:
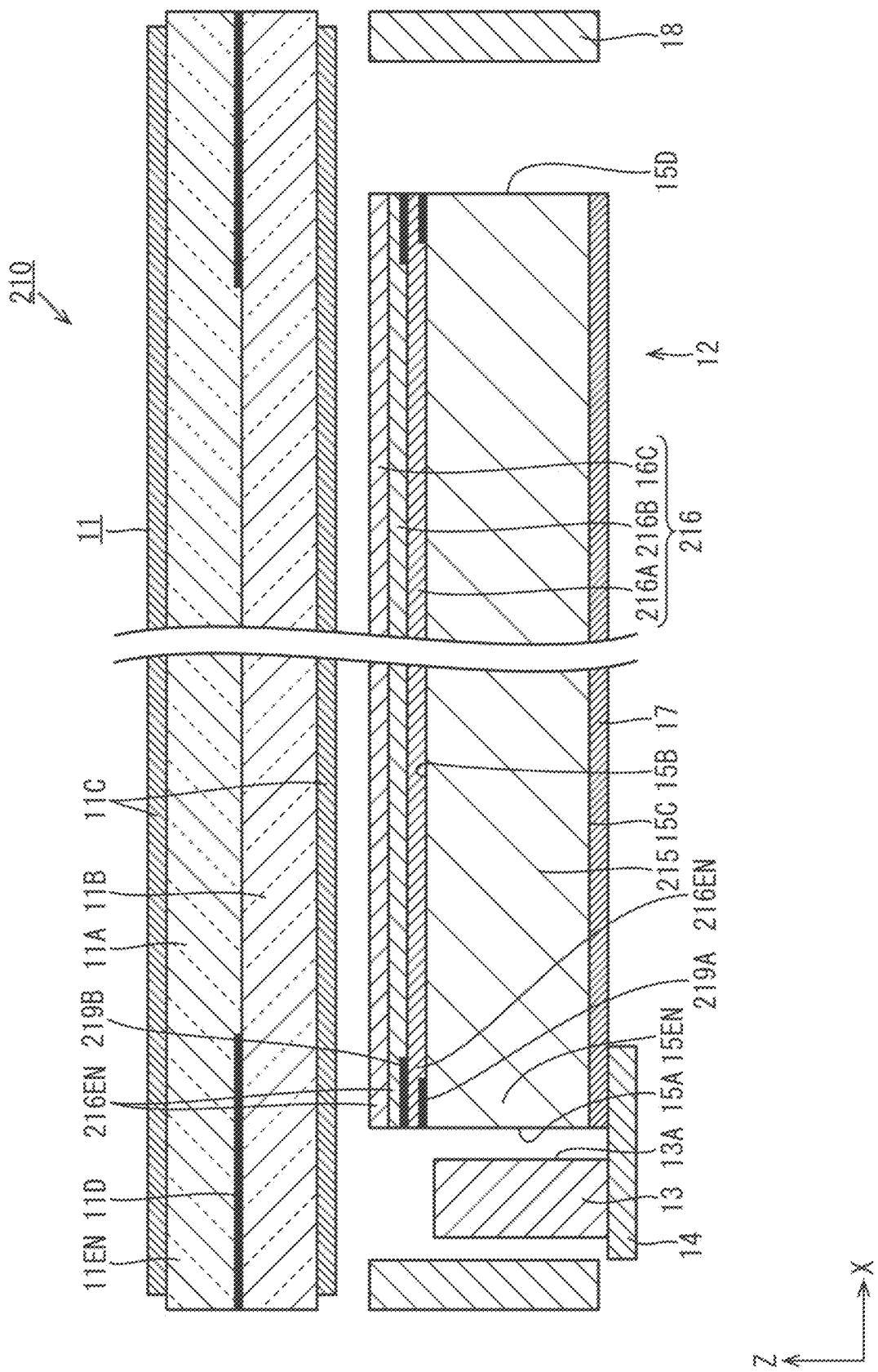
FIG. 4 is a cross-sectional view of a liquid crystal display device according to a third embodiment.

As illustrated in FIG. 4, a liquid crystal display device 210 includes an optical sheet 216 that includes a diffuser sheet 216A, a first prism sheet 216B, and a second prism sheet 216C. The first light blocking member 219A is formed on a back surface of the diffuser sheet 216A in an outer edge area 216EN through printing. The second light blocking member 219B is formed on a back surface of the first prism sheet 216B in an outer edge area 216EN through printing. The second light blocking member 219B is wider than the first light blocking member 219A. An inner edge of the second light blocking member 219B is located inner than an inner edge of the first light blocking member 219A. According to the configuration, even if the first light blocking member 219A closer to a light guide plate 215 fails to block light rays, the light rays are blocked by the second light blocking member 219B farther from the light guide plate 215. Therefore, the light rays are further properly blocked and thus bright spots are further less likely to be recognized.

Fourth Embodiment

A fourth embodiment will be described with reference to FIG. 5. The fourth embodiment include a light blocking member 319 that is different from the light blocking member 19 in the first embodiment. Configurations, operations, and effects similar to those of the first embodiment will not be described.

Figure 5:
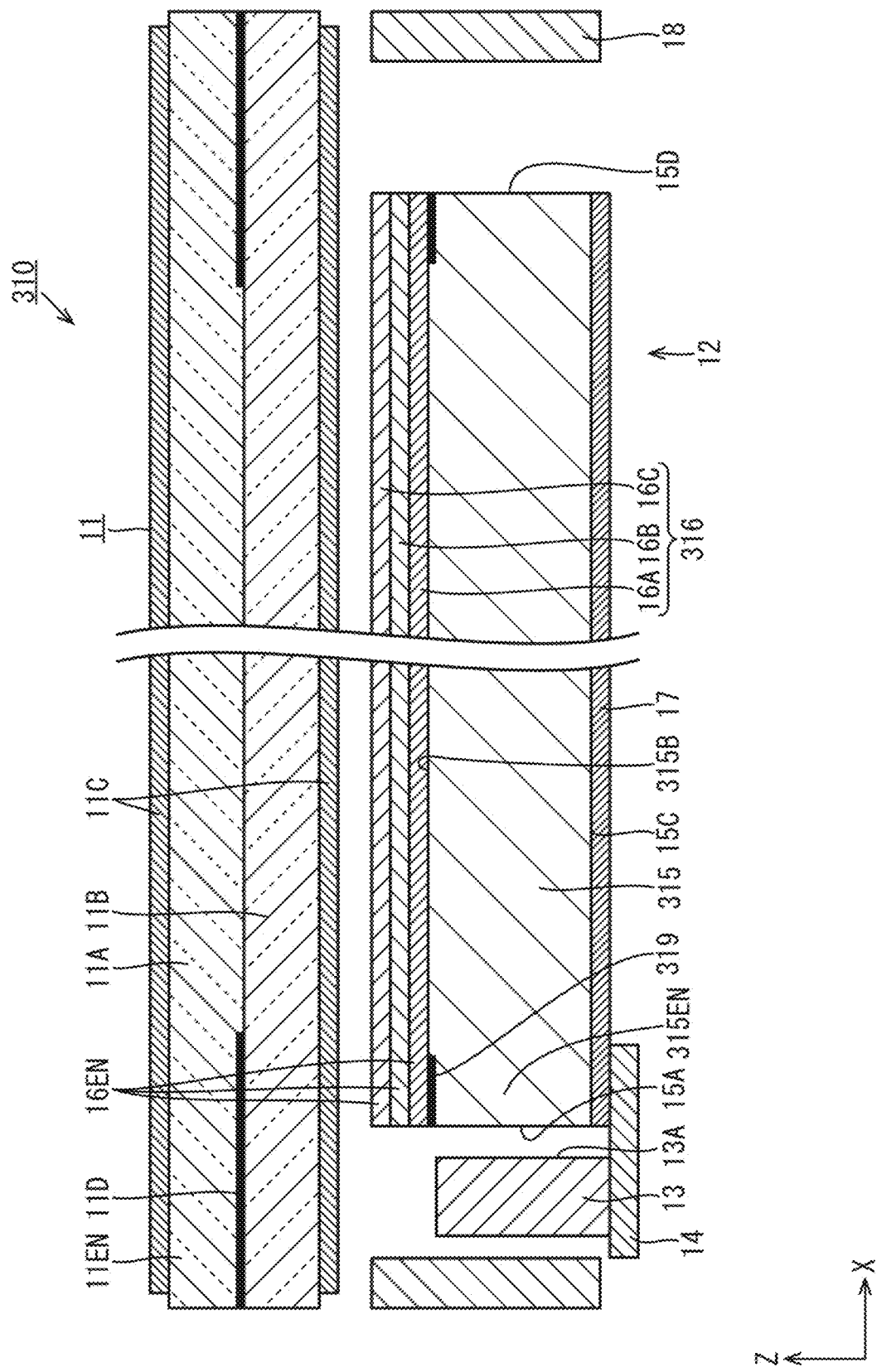
FIG. 5 is a cross-sectional view of a liquid crystal display device according to a fourth embodiment.

As illustrated in FIG. 5, a liquid crystal display device 310 includes the light blocking member 319 that is formed on a light exiting plate surface 315B of a light guide plate 315 in an outer edge area 315EN through printing. According to the configuration, light rays exiting from the light guide plate 315 through the light exiting plate surface 315B are blocked by the light blocking member 319 on the light exiting plate surface 315B. In comparison to a configuration in which only an optical sheet 316 includes a light blocking member, dark spots are less likely to be recognized.

Fifth Embodiment

A fifth embodiment will be described with reference to FIG. 6. The fifth embodiment includes a light blocking tape 419 formed on a second prism sheet 416C through processing different from printing in the first embodiment. Configurations, operations, and effects similar to those of the first embodiment will not be described.

Figure 6:
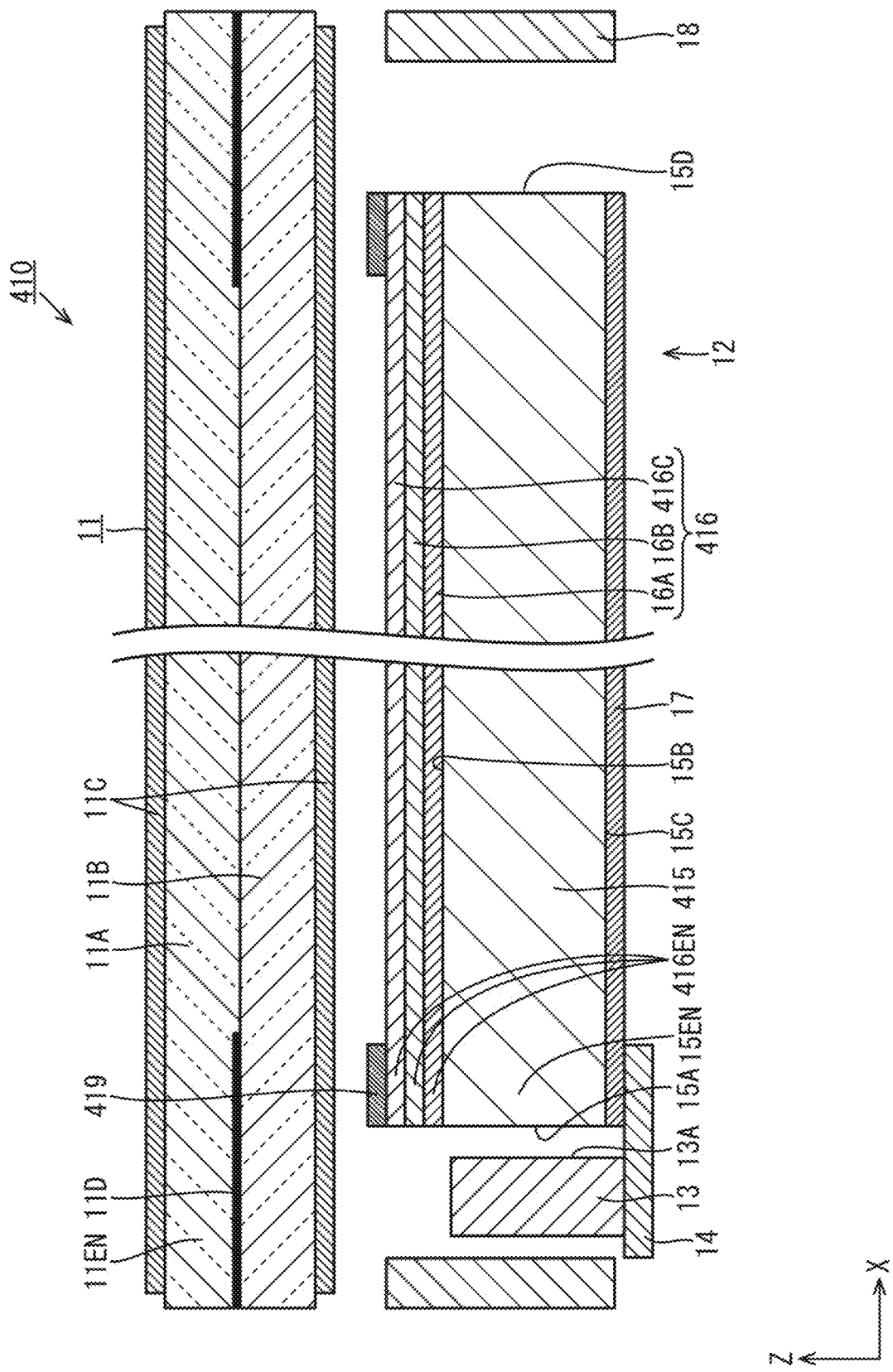
FIG. 6 is a cross-sectional view of a liquid crystal display device according to a fifth embodiment.

As illustrated in FIG. 6, a liquid crystal panel 410 includes an optical sheet 416 that includes the diffuser sheet 16A, a first prism sheet 16B, and the second prism sheet 416C. The second prism sheet 416C is disposed on the front side (the farthest from a light guide plate 415). The light blocking tape 419 is attached to a front surface of the second prism sheet 416C in an outer edge area 416EN. The light blocking tape 419 is in black having high light absorption properties. The light blocking tape 419 has an attaching surface to which an adhesive is applied and attached to the second prism sheet 416C.

Sixth Embodiment

A fifth embodiment will be described with reference to FIG. 7. The sixth embodiment includes a light blocking member 519 that is different from the light blocking member 19 in the first embodiment. Configurations, operations, and effects similar to those of the first embodiment will not be described.

Figure 7:
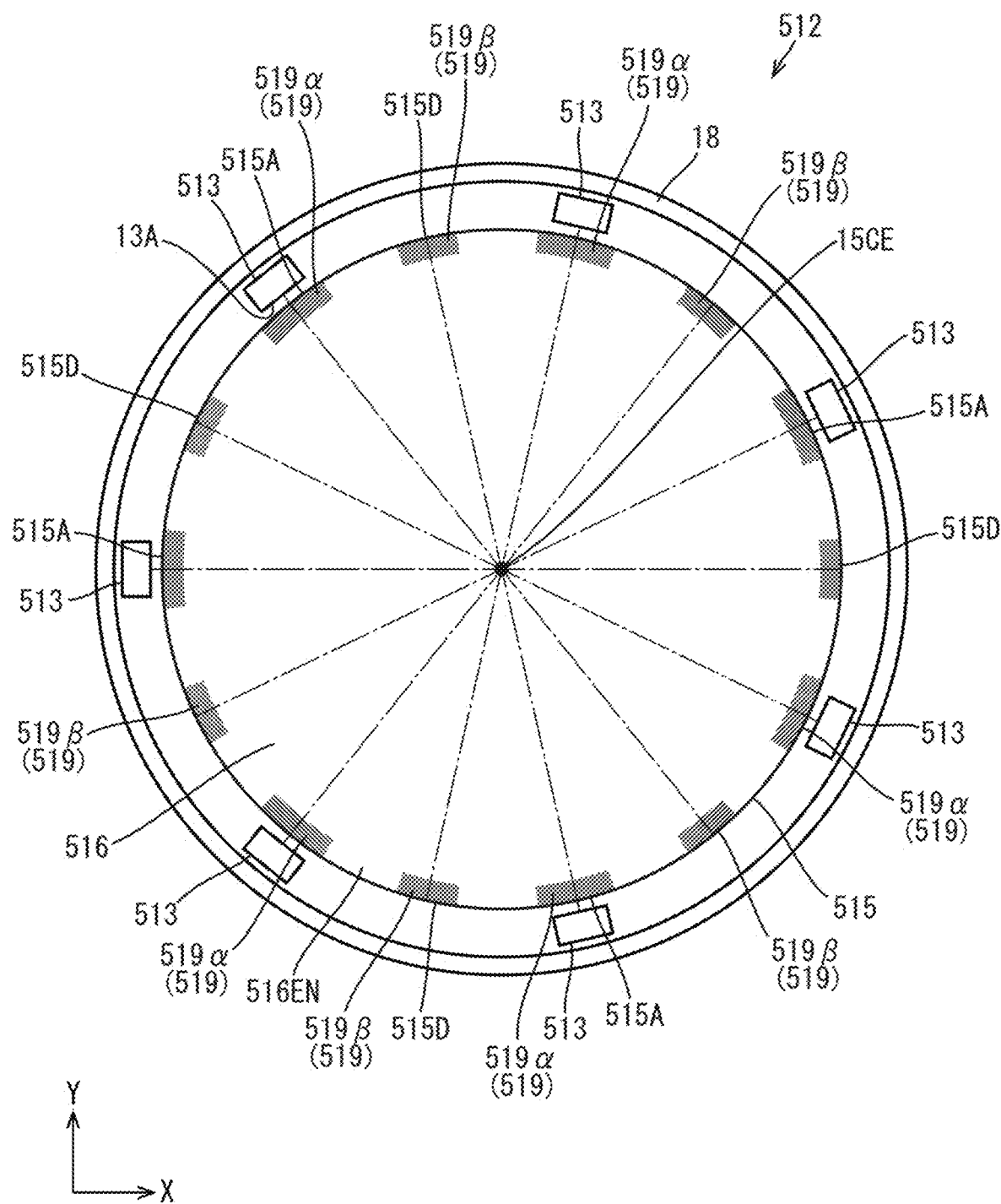
FIG. 7 is a plan view of a backlight unit according to a sixth embodiment.

As illustrated in FIG. 7, a light guide plate 515 includes a peripheral surface that includes light entering surfaces 515A and opposite surfaces 515D. The light blocking member 519 includes first light blocking members 519α and second light blocking members 519β at positions corresponding to the light entering surfaces 515A and opposite surfaces 515D in the circumferential direction, respectively. The total number of the first light blocking members 519α and the second light blocking members 519β is equal to the total number of the light entering surfaces 515A and the opposite surfaces 515D. The first light blocking members 519α and the second light blocking members 519β are arranged at equal intervals in the circumferential direction in an outer edge area 516EN of an optical sheet 516. In comparison to the light blocking member 19 in the first embodiment (see FIG. 2), an amount of light blocked by the light blocking member 519 is reduced. According to the configuration, an amount of light emitted by the backlight unit 512 increases and thus brightness is less likely to decrease due to the light blocking member 519.

The first light blocking members 519α are at positions corresponding with the light entering surfaces 515A with respect to the circumferential direction. The second light blocking members 519β are at positions corresponding with the opposite surfaces 515D with respect to the circumferential direction. Each first light blocking member 519α has a dimension in the circumferential direction greater than a width of an LED 513. According to the configuration, light rays exiting from the light guide plate 515 through sections of a light exiting plate surface closer to the light entering surfaces 515A are blocked for larger areas in the circumferential direction. Therefore, bright spots around to the light entering surfaces 515A are further less likely to be recognized. Each second light blocking member 519β has a dimension in the circumferential direction less than the dimension of the first light blocking member 519α in the circumferential direction. According to the configuration, the amount of light blocked by the second light blocking members 519β is less than the amount of light blocked by the first light blocking members 519α. The brightness is less likely to be reduced. The amount of the light rays exiting sections of the light exiting plate surface of the light guide plate 515 closer to the opposite surfaces 515D tends to be less than the amount of the light rays exiting sections of the light exiting plate surface of the light guide plate 515 closer to the light entering surfaces 515A. According to the configuration, the bright spots around the opposite surfaces 515D are less likely to be recognized although the dimension of the second light blocking members 519β in the circumferential direction is less than the dimension of the first light blocking members 519α.

Seventh Embodiment

A seventh embodiment will be described with reference to FIG. 8. The seventh embodiment includes a backlight unit 612 having a shape different from the shape of the backlight unit 12 in a plan view. Configurations, operations, and effects similar to those of the first embodiment will not be described.

Figure 8:
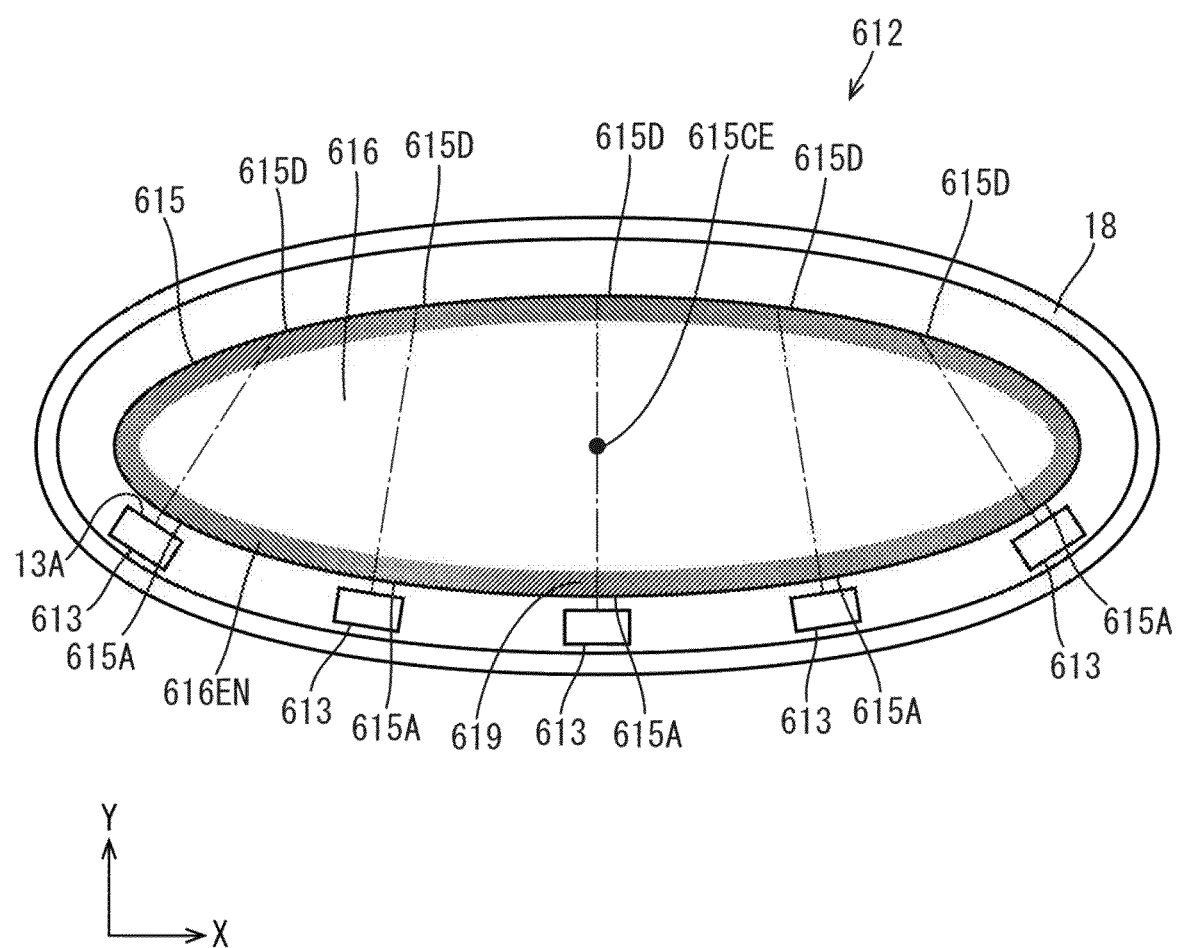
FIG. 8 is a plan view of a backlight unit according to a seventh embodiment.

As illustrated in FIG. 8, the backlight unit 612 has an ellipsoidal shape in the plan view with a major axis corresponding with the X-axis direction and a miner axis corresponding with the Y-axis direction. The backlight unit 612 includes LEDs 613 and a light guide plate 615 that has an ellipsoidal shape in the plan view. The light guide plate 615 includes a periphery that includes a first half and a second half divided by the major axis (along the X-axis direction). The LEDs 613 are disposed along the first half of the periphery of the light guide plate 615. Specifically, five LEDs 613 are arranged at intervals along the first half of the periphery to be opposed to the half of the periphery. The first half of the periphery includes five light entering surfaces 615A arranged at intervals. The second half of the periphery includes five opposite surfaces 615D arranged at intervals. A light blocking member 619 extends for an entire outer edge area 616EN of an optical sheet 616 that has an ellipsoidal shape. The light blocking member 619 has an oval ring shape in the plan view.

Other Embodiments

The technology described herein is not limited to the embodiments described above and with reference to the drawings. The following embodiments may be included in the technical scope.

(1) The light blocking members in the first to the five and the seventh embodiments may be divided into multiple pieces that may be arranged across the opposite surfaces between the light entering surfaces in the circumferential direction or across the light entering surfaces between the opposite surfaces.

(2) The light blocking members in the first to the third, the sixth, and the seventh embodiments may be formed on the plate surfaces of the optical sheets on the front side in the outer edge areas through printing.

(3) Light blocking portions may be formed on the optical sheets or the light guide plates through processing other than printing or adhesion (e.g., application of light blocking paint).

(4) The light blocking members may be formed on both optical sheet and light guide plate.

(5) The light sources may be disposed to be opposed to the opposite surfaces instead of the light entering surfaces.

(6) The light blocking member in the second embodiment is formed in the outer edge area of the second prism sheet instead of the outer edge area of the first prism sheet through printing.

(7) The first light blocking member 219A and the second light blocking member 219B in the third embodiment may be configured such that the inner edge of the first light blocking member 219A and the inner edge of the second light blocking member 219B are on the same plane that is perpendicular to the light exiting plate surface 15B of the light guide plate 215. The first light blocking member 219A may be configured such that the inner edge of the first light blocking member 219A is located inner than the inner edge of the second light blocking member 219B.

(8) The light blocking members in the third embodiment may be formed in the outer edge areas of the first prism sheet and the second prism sheet or in the outer edge areas the diffuser sheet and the second prism sheet.

(9) The light blocking tape 419 in the fifth embodiment may be attached to an outer edge area of the plate surface of the second prism sheet on the rear side. Alternatively, the light blocking tape 419 may be attached to an outer edge area of the plate surface of the diffuser sheet or the first prism sheet on the front side or the rear side. The light blocking tape 419 may be attached to an outer edge area of the light exiting plate surface of the light guide plate.

(10) The first light blocking members 519α and the second light blocking members 519β in the sixth embodiment may be arranged such that some of the first light blocking members 519α and some of the second light blocking members 519β are connected to each other such that the total number of the first light blocking members 519α, the second light blocking members 519β, and combinations of the first light blocking members 519α and the second light blocking members 519β is less than the total number of the light entering surfaces 515A and the opposite surfaces 515D.

(11) Each of the first light blocking members 519α in the sixth embodiment may have a width about equal to or less than the width of the LEDs 513. Each of the second light blocking members 519β may have a width about equal to or greater than the width of the first light blocking members 519α.

(12) The first light blocking members 519α and the second light blocking members 519β may be arranged the centers of the first light blocking members 519α and the second light blocking members 519β do not correspond with the centers of the respective light entering surfaces 515A and the respective opposite surfaces 515D with respect to the circumferential direction.

(13) The first light blocking members 519α and the second light blocking members 519β may be formed on the first prism sheet or the second prism sheet in the optical sheet 516 or the light guide plate 515. The first light blocking members 519α and the second light blocking members 519β may be formed on any two or all of the diffuser sheet, the first prism sheet, and the second prism sheet.

(14) Each of the above embodiments may include reflectors attached to the opposite surfaces of the light guide plate to reflect light rays that leak through the opposite surfaces by the reflectors and to return the light rays to the opposite surfaces.

(15) The peripheral surfaces of the light guide plate, the optical sheet, and the reflection sheet in each of the above embodiments may not be flush with one another. The peripheral surfaces of the optical sheets may not be flush with one another.

(16) Backlight units having irregular contours other than a round shape, an ellipsoidal shape, and a rectangular shape may be included in the technical scope. The irregular contours include semicircular shapes, fan shapes, and trapezoidal shapes. Backlight units having rectangular shapes may be included in the technical scope.

(17) The number of the LEDs may be altered from the number of the LEDs in each of the above embodiments where appropriate. The LEDs in odd number and equiangularly arranged are not opposed to the opposite surfaces. The number of the LEDs may be an even number.

(18) The LEDs in each of the above embodiments may be arranged at irregular intervals.

(19) The number, the kinds, and the sequence of the optical sheets in each of the above embodiments may be altered where appropriate.

(20) The technology described herein may be applied to liquid crystal display devices including semitransmissive liquid crystal panels.

(21) The technology described herein may be applied to micro electro mechanical systems (MEMS) display panel.

(22) The technology described herein may be applied to liquid crystal display devices for head mounted displays and head-up displays. The technology described herein may be applied to onboard liquid crystal display devices for car-navigation systems, radar detectors, and instrument panels.

The invention claimed is:

1. A lighting device comprising:
   at least one light source;
   a light guide plate including a section of a peripheral surface opposed to the at least one light source defined as at least one light entering surface, a section of the peripheral surface opposite from the at least one light entering surface defined as at least one opposite surface, and a plate surface defined as a light exiting plate surface through which light exits;
   an optical sheet disposed over the light exiting plate surface that applies optical effects on the light exiting from the light guide plate through the light exiting plate surface; and
   at least one light blocking member in an outer edge area of at least one of the light guide plate and the optical sheet to block the light from the light guide plate through the light exiting plate surface, the at least one light blocking member extending in a peripheral direction along the peripheral surface in which the at least one light entering surface and the at least one opposite surface are arranged, wherein
   the optical sheet includes a plurality of optical sheets on top of each other, and
   the at least one light blocking member is on at least one of the plurality of optical sheets closest to the light guide plate.

2. The lighting device according to claim 1, wherein the at least one light source includes a plurality of light sources disposed at intervals in the peripheral direction not to be opposed to the at least one opposite surface.

3. The lighting device according to claim 2, wherein
   the at least one light entering surface includes a plurality of light entering surfaces opposed to the light sources,
   the at least one opposite surface includes a plurality of opposite surfaces opposite from the light entering surfaces and between the light entering surfaces, and
   the at least one light blocking member extends across at least the opposite surfaces between the light entering surfaces.

4. The lighting device according to claim 2, wherein the at least one light blocking member extends for an entire circumference of the outer edge area.

5. The lighting device according to claim 2, wherein the at least one light blocking member includes a plurality of light blocking members at positions in the peripheral direction corresponding with positions of the light entering surfaces and the opposite surfaces in the peripheral direction, respectively.

6. The lighting device according to claim 5, wherein
   the light blocking members include first light blocking members and second light blocking members,
   the first light blocking members are at the positions in the peripheral direction corresponding with the positions of the light entering surfaces in the peripheral direction,
   the second light blocking members are at the positions in the peripheral direction corresponding with the positions of the opposite surfaces in the peripheral direction, and
   the first light blocking members have a dimension in the peripheral direction greater than a dimension of the light sources in the peripheral direction.

7. The lighting device according to claim 6, wherein the second light blocking members have a dimension in the peripheral direction less than the dimension of the first light blocking members in the peripheral direction.

8. The lighting device according to claim 1, wherein
   the at least one light blocking member includes light blocking members disposed on at least two of the plurality of optical sheets.

9. The lighting device according to claim 1, wherein the at least one light blocking member is disposed on at least the light exiting plate surface of the light guide plate.

10. A display device comprising:
    the lighting device according to claim 1; and
    a display panel that displays images using light from the lighting device.

11. The display device according to claim 10, wherein
the display panel includes a panel-side light blocking
   member disposed in an outer edge area of the display
   panel, and
the panel-side light blocking member includes an inner
   edge disposed inner than an inner edge of the at least
   one light blocking member.

* * * * *